(12) United States Patent
Villagra

(10) Patent No.: US 11,781,474 B2
(45) Date of Patent: Oct. 10, 2023

(54) GASEOUS FUEL GENERATOR EQUIPMENT HYDROGEN-OXYGEN APPLIED TO INTERNAL COMBUSTION ENGINES

(71) Applicant: Guillermo Alejandro Serrano Villagra, Puerto Madryn (AR)

(72) Inventor: Guillermo Alejandro Serrano Villagra, Puerto Madryn (AR)

(*) Notice: Subject to any disclaimer, the term of this patent is extended or adjusted under 35 U.S.C. 154(b) by 0 days.

(21) Appl. No.: 17/660,651

(22) Filed: Apr. 26, 2022

(65) Prior Publication Data

US 2023/0114536 A1   Apr. 13, 2023

(30) Foreign Application Priority Data

Oct. 8, 2021   (AR) .............................. P20210102802

(51) Int. Cl.
*F02B 43/10*   (2006.01)
(52) U.S. Cl.
CPC ........ *F02B 43/10* (2013.01); *F02B 2043/106* (2013.01)
(58) Field of Classification Search
CPC ............................ F02B 43/10; F02B 2043/106
USPC ............................................................ 123/3
See application file for complete search history.

(56) References Cited

U.S. PATENT DOCUMENTS

| | | |
|---|---|---|
| 4,018,190 A | 4/1977 | Renault |
| 4,036,180 A | 7/1977 | Nippon |
| 4,041,910 A | 8/1977 | Houseman |
| 4,124,463 A | 11/1978 | Blue |
| 2012/0073521 A1* | 3/2012 | Owens .................... F02M 25/12  123/3 |
| 2013/0174797 A1* | 7/2013 | Owens ...................... C25B 9/73  123/3 |
| 2013/0186350 A1* | 7/2013 | Owens .................... F02M 25/12  123/3 |
| 2013/0276726 A1* | 10/2013 | Owens .................... F02B 43/10  123/3 |
| 2014/0290595 A1* | 10/2014 | Owens .................... C25B 15/02  123/3 |
| 2019/0010621 A1* | 1/2019 | Bogers .................... C25B 15/02 |

FOREIGN PATENT DOCUMENTS

| | | |
|---|---|---|
| AR | 197850 | 5/1974 |
| EP | 0079736 | 5/1983 |
| ES | 199600 | 1/1974 |
| ES | 8400794 | 11/1983 |

(Continued)

*Primary Examiner* — John Kwon
*Assistant Examiner* — Johnny H Hoang
(74) *Attorney, Agent, or Firm* — Defillo & Associates, Inc; Evelyn A. Defillo

(57) ABSTRACT

A hydrogen-oxygen gaseous fuel generating equipment applied to internal combustion engines including a hydrogen and oxygen gas (H2-O2) generation circuit having a main water tank with at least one outlet duct of the fluid to a set of plates and conducted the fluid to a section of supply pipe to an input connector of an electrolyzer equipment associated with a pair of connector terminals, powered by an electrical energy source defined by a set having an electric accumulator, as a power supply of the set of plates where a mixture of oxygen hydrogen is extracted is derived to the decanter tank where it is separated from the water and the oxygen gas is ready for injection into the motor.

3 Claims, 2 Drawing Sheets

(56) References Cited

FOREIGN PATENT DOCUMENTS

| | | |
|---|---|---|
| ES | 8506140 | 6/1985 |
| ES | 8603621 | 12/1985 |
| JP | 51-124707 | 4/1975 |
| JP | 51-138203 | 4/1975 |
| WO | WO0198202 | 12/2001 |

* cited by examiner p: inch

GASEOUS FUEL GENERATOR EQUIPMENT HYDROGEN-OXYGEN APPLIED TO INTERNAL COMBUSTION ENGINES

FIELD OF APPLICATION

The invention relates to a "Hydrogen-oxygen gaseous fuel generating equipment applied to internal combustion engines", either by carburetion or injection. The gaseous fuel ($H_2$—$O_2$) is obtained, basically in the use of water, which is subjected to an electrolysis process, as a result hydrogen gas(2) and oxygen (1) are obtained, which is combined obtaining a mixture under conditions of a controlled ignition, which is used as fuel by injecting it at low pressure (1.2-2 kg depending on it) in the combustion chamber of the engine, and is related to the field of mechanics, more specifically with the branch of automotive transport, moped, ships, equipment and machines such as agricultural, rolling and stationary construction.

Electrolysis is performed using efficient cells created for this purpose (FIG. 1b) and is carried out with an electrolyte composed of distilled water, specially conditioned by chemical means (sodium hydroxide) in order to achieve generous gas production.

The hydrogen ($H_2$) and oxygen ($O_2$) gases produced are not separated into containers but remain mixed. The detonator of the gas produced is a stoichiometric mixture of hydrogen, (two parts vol.) and oxygen, (one part vol.) and, can be burned in a vacuum under conditions of a controlled ignition that is used as fuel injecting it at low pressure into the combustion chamber of the engine and is related to the mechanic's field.

In the description that follows, the invention is exposed in general for application in the automotive field, preferably applied on board a vehicle however its adaptation and application in other fields can also be contemplated.

PRIOR ART AND BACKGROUND TO THE INVENTION

Depleting natural resources, dangerous levels of environmental pollution, progressively increasing prices and dependence on other countries are making it increasingly necessary to look for a valid alternative, aimed at replacing fossil fuels (hydrocarbons and their derivatives) as the main source of fuels for stationary engines and others.

For 45 years, practically all industrialized countries have been developing high-tech programs, in order to use hydrogen as a substitute source of energy. The alternatives are many, for example obtaining hydrogen from water, methane, methanol, petroleum, through solar, electrical, wind, etc. Various industrial plants of electricity production through fuel cells are still operating experimentally.

The use of hydrogen gas, as a substitute for naphtha, has been experimented with recently; chemistry researcher Derek P. Gregory is cited as believing that hydrogen is the ideal fuel in more than one way. The combustion of hydrogen produces steam as its only residue, a decisive and forceful advantage over conventional polluting fuels such as naphtha and coal derivatives.

Unfortunately, hydrogen scarcely exists on earth in its natural state and in free form, but only combined with other elements and chemical compounds, from which it must be extracted using industrial processes of high complexity, cost and often risk.

In addition, if this obstacle were to be overcome, it would still be necessary to transport and store hydrogen in service stations installed for this purpose, and also to find a safe and practical way to load it and store it in vehicles, with an internal combustion engine.

Regarding the inventions and developments of programs for the use of hydrogen in automobiles, (currently all these programs are through the use of liquid hydrogen stored in special tanks), we can cite among others, mainly the following, namely:

a) SAM LESLIE LEACH, patented in 1979 a system of separation of hydrogen from water; consisting of injecting water vapor into a reaction chamber and subjecting it to ultraviolet radiation with a certain band, achieving the ionization of hydrogen and oxygen atoms. No further developments of this system are known.

b) MAZDA, currently has a car called "MIATAS", in operation, powered by hydrogen, uses the rotary engine of the MAZDA, producing 115 hp, accelerating from 0 to 100 km in 13 seconds, the gasoline version takes 9.4 seconds. The MIATAS handles and accelerates as if it were powered by gasoline. The hydrogen comes from a storage tank located in the lower part of the car; it is loaded into 15 minutes. The weight of such a tank is 297 kg, and that of gasoline is 50 kg. The range is 200 km, MAZDA estimates that hydrogen-powered cars, stored in tanks, will cost 50% more than gasoline-powered ones. Likewise, the firm considers that around the year 2010, it will begin to use its vehicles that need hydrogen stations.

c) STAN MEYER, holding 30 patents since 1993 has developed a hydrogen fractionation technology based on subjecting sprayed water to the effects of a high frequency and voltage, within a chamber with resonance of a sphere. Apparently, the efficiency is better than known electrolytic systems.

It is currently miniaturizing components and developing the electronic process control system; one piece of equipment was installed in a BUGGY car with no relevant results.

GENERAL MOTORS, FORD COMPANY, CHRYSLER COMPANY, TOYOTA, HONDA, BMW, RENAULT, VW, and other manufacturers have been working for 20 years on the alternative propulsion system to gasoline, with engines powered by hydrogen from a liquid hydrogen storage tank and has several vehicles currently in test.

d) In Russia, in addition to experimentation programs with explosion engines, fuel supply systems to the jet turbines of various aircraft models have been developed in recent years. The tests have been carried out with a TU-155. Currently, a consortium made up of Russian and German companies are developing a project for an aircraft that uses hydrogen as fuel.

e) YULL BROWN, produced an electrolytic system of separation of hydrogen and oxygen from water, producing a gas, which he called Brown Gas, this gas can be handled and stored reliably. Brown ran car engines with this gas, apparently without difficulty, but later this alternative was abandoned. This electrolytic system produces around 350 litres of gas per Kw of electricity.

f) GENERAL MOTORS, FORD COMPANY, CHRYSLER COMPANY, TOYOTA, HONDA, BMW, RENAULT, VW, and other manufacturers have been working for 20 years on the alternative propulsion system to gasoline, with engines powered by hydrogen from a liquid hydrogen storage tank and has several vehicles currently in test.

g) MERCEDES BENZ, has been working for years on a vehicle with a powerplant powered by hydrogen generated by an electrolyzer, this firm has announced the presentation to the public of said vehicle shortly.

It has also experimented with hydrogen-powered models with the same system used by MAZDA, i.e. stored hydrogen, and not produced on board the vehicle. The system has safety problems and needs places to supply hydrogen, such as gas stations, to cars. At the moment the system is not commercially profitable.

h) GIANNI DOTTO, invented a very complex system, not applicable to a vehicle, for the separation of hydrogen and oxygen from distilled water.

i) ARCHIE H. BLUE, U.S. Pat. No. 4,124,463, dated November 1978, invented an electrolytic system, which supplies a mixture of water and air, which can be used as fuel for an internal combustion engine. Several systems were coupled and an internal combustion engine was operated.

j) THE UNIVERSITY OF CANTERBURY NEW ZELAND and Finnish universities, are conducting studies with engines in which they are used as fuel, a mixture of water vapor and hydrogen, achieving an increase in pressure. The Finns have introduced a combustion pre-chamber in the opening of the spark plugs, in order to avoid self-ignition.

Therefore, it is a known technical fact the use of hydrogen as an alternative fuel in internal combustion engines, it is today a real option and not virtual. Hydrogen is available in unlimited quantities and its use produces practically no pollution produces a phenomenon that increases effective power, reduces hourly consumption and mitigates CO and HC emissions and particles that result from the incomplete combustion of the fuel mixture.

It is also known that introducing hydrogen gas and other non-combustible substances into the combustion chamber increases the performance of internal combustion engines and especially in stationary engines. Hydrogen can be introduced in ways that are thought to be advantageous namely:

Direct feeding of hydrogen gas (H2) fuel with the aim of improving combustion (e.g. Japanese patent publications JP 51-138203; JP 51-124707, American patent publications: U.S. Pat. Nos. 4,018,190 A, 4,036,180 A and 4,041,910 A.

Direct injection of hydrogen gas and water vapor into the combustion chamber e.g. the European patent EP 0079736 B1, the Spanish patents ES 8603621, ES 8506140, and ES 8400794.

Feeding with hydrogen and gaseous oxygen applied to an internal combustion engine (Argentine patent AR 197.850), electrolytically generated in situ from water and is characterized by comprising an electrolytically closed cell connected to an electrical energy source, provided with hydrogen and oxygen collecting media formed, in a common channel that flows into a pump dosing machine, which includes this intake of the gases formed in the electrolysis of water, an adjustable primary air intake and a channeling of the air-hydrogen-oxygen mixture formed, to a storage tank of said pressure mixture, communicating with the cylinders of said engine, through a valve acceleration with the interposition of a safety valve between the aforementioned tank and the acceleration valve, the acceleration valve being synchronized with a regulated secondary suction air intake and responding to the acceleration of the engine, the storage tank being provided with a diaphragm switch sensitive to the pressure of the stored gases, of opening and closing an electrical circuit between that source and the electrolytic cell, in response to a predetermined pneumatic charge in the mentioned tank.

Also worth mentioning is the Spanish publication ES 199.600, which discloses an electrolytic motor comprising an electrolytic vat for the decomposition of water into its hydrogen and oxygen components, which are used as fuel for a conventional engine of adequate dimensions, and is characterized by the fact that the electrolytic tank presents its electrodes in a truncated conical shape, arranged in a coaxial direction, acting as conduits of the gases resulting from the electrolytic decomposition, which the gases inside the engine, are converted back into water by the effect of the spark of the spark plug, passing the resulting steam through the interior of a cooling coil that deposits the water again in the tank, while the energy from the engine's crankshaft is used to drive a generator that will supply the electricity needed for the electrodes and spark plug.

It is also of great importance in the technique the use of fuel cells and production of Hydrogen, it is necessary to know that fuel cells are electrochemical devices that produce electricity obtaining protons and electrons from a fuel, usually hydrogen, natural gas or methanol.

It is known, in the case of a vehicle, one of the main technical problems is to store hydrogen, a gas with a very low density and highly flammable. A solution that Atípic has opted for is the production of ($H_2$) in the same car from methanol. In this way you get an electric vehicle that has the same autonomy as a current gasoline vehicle with the same tank volume. Charging would continue to be done at traditional gas stations identically to traditional vehicles, without changing habits on the part of users. The technical challenges are formidable, but since 1999 Atípic has been working to make EXPERT AUTOMOTIVE CORPORATION, based in Abrera, one of the first companies in the world to have an on-board methanol processor for motor vehicles (Patent WO/0198202A1, Method to obtain hydrogen by partial oxidation of methanol.

The alternative to producing hydrogen on board is to work with fuel cells that work directly with methanol (direct methanol fuel cells). Currently, Atípic is developing for a Catalan high-tech company located in the Valles Technology Park, a 500 W fuel cell for a mobile application. If the project is successful, it is planned to make the first public demonstrations of the operation of the system.

One of the technical problems presented by internal combustion engines that use hydrogen gas as fuel is that while the engine is at low speed due to limitation of fuel supply, its operation must be maintained by means of a mixture diluted with air, instead at full speed with an increased fuel supply, premature combustion occurs due to the increase in the concentration of hydrogen, which easily produces self-ignition and detonations, rapidly increasing the pressure.

In conclusion, the increase in the possibility of using energy at a very low price will undoubtedly considerably increase the quality of the standard of living, and consequently the mathematical hope of greater longevity, as well as the social well-being of all countries.

Objectives

Based on the current state and the previous art of the technique mentioned above, the specific objective of the invention is based on a "Hydrogen gaseous fuel—oxygen generating equipment applied to combustion engines", particularly combustion, internal installed on "board" a vehicle associated with a set of mechanisms to achieve a uniform supply of hydrogen gas (H2) (two parts vol.) and oxygen gas, (O2), (one part vol.) in the combustion chamber both at high and low speed (idle) as well as its timely ignition in a reliable and safe way, instead of the traditional gasoline or diesel system; and also that it is able to effectively convert the explosive energy generated by the combustion of said hydrogen gas (H2), oxygen gas (O2) in dynamic-mechanical energy and obtain such gas in a form which can be used for this purpose, from an abundantly available substance.

Basic Description of the Hydrogen-Oxygen Gaseous Fuel Generating Equipment,

The equipment contains basically:

I. An Electrolyzer for the decomposition of water into its component's hydrogen ($H_2$) and oxygen ($O_2$).
II. A decanter reservoir.
III. A water tank.
IV. A 12-volt 75-amp source.
V A current elevator (pwn) 12 vol at 24 vol and 20 amps of current. VI. A flowmeter.
VII. A gas injector regulator with pump.
VIII. A pump that circulates water.

This equipment includes a gas generation circuit ($H_2$—$O_2$) and a gas supply circuit ($H_2$—$O_2$) operationally linked to each other by means with relevant technical characteristics to condition and supply said gas ($H_2$—$O_2$) to the combustion chamber of said engine.

The gas ($H_2$—$O_2$) is obtained on board, from a source of hydrogenated compounds. Injected into each injector at its corresponding time.

The gas generation circuit basically consists of an electrolyzer (FIG. 1) that receives water or some other hydrogenated substance suitably adapted through a process developed, patented by me, for the electrolysis process.

The electrolyzer built, was technically tested and worked very well, being discovered as a result of the vapor content in the gas overcoming the latent dangers found in the previous prototype systems, which injected relatively dry gas into the chamber of the cylinders or at most, with a relatively small proportion of moisture coming from air itself.

A source of electrical energy (a pwn generator and accumulator of 24 Volts), is connected to the plates of the electrolyzer to generate gas, with this equipment we can use the battery of said motor and raise in the current that is suitable to produce OXYGEN HYDROGEN ($H_2$—$O_2$)—

Electrolysis is conducted with a continuous force signal between 5 (five) and 235 (thirty-five) Amper, and between 20-80 Volts depending on the engine to which the gas is to be injected. The gas and steam that have been generated feeds a receptacle provided with the means to remove the unwanted excess moisture from the gas. The gas is mixed with the desired steam content, when it enters the mixer-feeder device.

The gas ($H_2$—$O_2$) mixes with water vapor and surrounding air, and when this mixture ignites inside the combustion chamber, the steam acts as a temperature moderator in the first place (problem we had at the beginning, elevated temperatures in the combustion chamber that was solved in this way), and then it helps in the expansion time. Preferably, water vapor is saturated steam, which as a moderator limits the maximum temperature of combustion, thus helping to preserve the components of the cylinders, valve and piston, facilitating expansion the steam expands rapidly adding extra pressure in the piston head.

In other words, the inclusion of water vapor (product of the combustion of hydrogen as waste) in hydrogen, added before entering the combustion chamber, moderates the negative effects of hydrogen and increases its positive effects on the combustion cycle.

The supply circuit of this gas basically includes all the means to condition the moisture content of the hydrogen gas, a mixer-feeder device, to mix the gas with the atmospheric air if necessary to allow a good combustion in aspirated engines, means to control and maintain a specific gas pressure in valve or regulator, half injectors, and an electronic control unit exclusively for injection engines.

As a result of the practice and testing of this discovery, the operation of the engine has been achieved in all regimes with a gaseous mixture, containing a small amount of hydrogen and that the battery-alternator set coupled to the engine, during its operation, produces enough electrical energy to power the electrical equipment of the car, and the operation of the Electrolyzer, to produce the necessary and sufficient amount of hydrogen gas and oxygen; achieving a battery life of around 15,000/25,000 km or 200/600 hours of operation at cruising speed. Engine maintenance is the same as maintenance for the engine that uses gasoline as fuel.

The water consumption at cruising speed, of the current system developed for engines from 1000 to 2000 cm3 of displacement, is around 2 (two) liters of water per 100 Km; this consumption shall be deemed to be reduced when the engine is operated at low revolutions per minute and the consumption of the hydrogen oxygen gas mixture is adjusted.

It is very important to point out the safety of the system consisting of the production of gas at the request or demand requested by the engine speed.

Leaving a residual of 3000 $cm^3$ of gas in the container, for the initial demand. The maximum working pressure of this distributor tank is limited to 3 $Kg/cm^2$, this system is equipped with a series of censor devices and controls that protect and guarantee the safety of operation.

LIST OF EQUIPMENT COMPONENTS 01. water reservoir and fulfills the function of $H_2O_2$—separator
02. and 03. set of electrolyzing plates, ($H_2$ O)
03. water circulator pump
04. A. and 05. B. activated carbon filter.

Principle of Operation

The production of $H_2$ is obtained by electrolysis from molecularly ordered water with a pH ranging from 9.00 to 12.8 with ppm values between 1900 and 3000 and, ms in a range of 900 to 2000.

Figure 1:
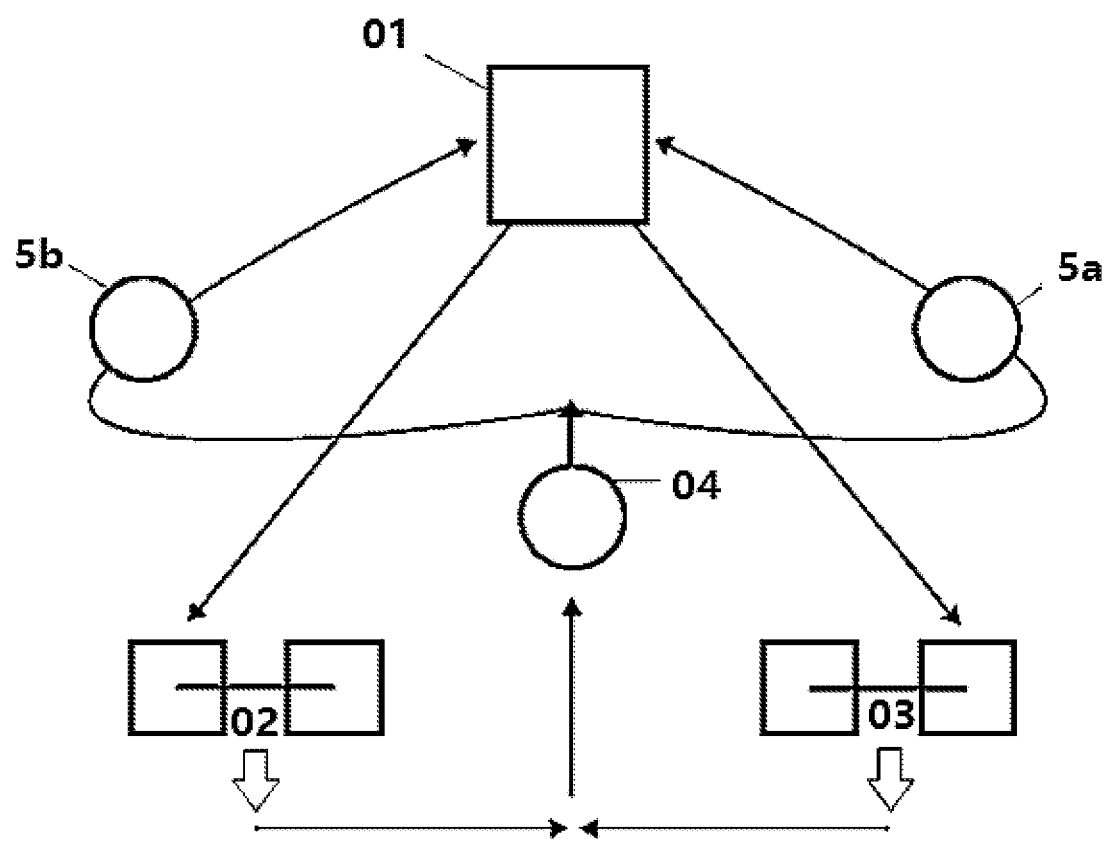
FIG. 1, it is a schematic representation of the equipment to generate hydrogen-oxygen gaseous fuel of the object of the invention.
Figure 2:
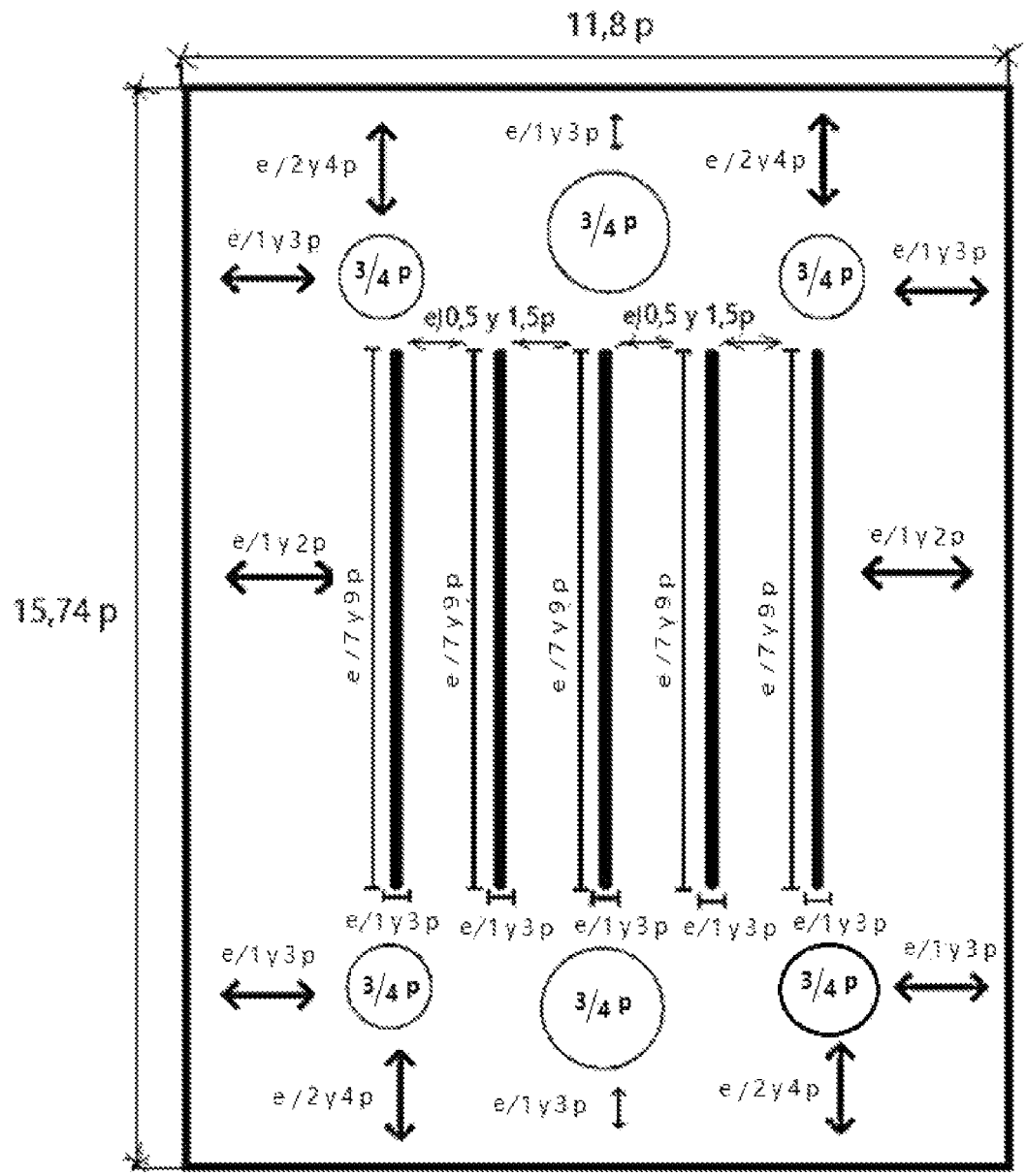
FIG. 2 illustrates an $H_2O_2$ producing plate that, depending on its configuration, adapts to engines of 200 cc or more.

The electrolysis is carried out in a plate electrolyzer (FIG. 2) built in neutral material, (non-conductive), resistant to withstand pressure, 6 kg, anti-magnetic anticorrosive and that can withstand temperatures of up to 160° C. without altering its structure.

The size of the electrolyzer and the number of plates may vary according to the production that is necessary, in order to maintain the constant flow to feed the motor in question, starting from one of 200 cc and from there on without limit of displacement, adapting the system to the need of production to supply the requirements of said motor, are fixed or incorporated into land, river, sea or air navigation vehicles.

In the gas generation circuit, the electrolyte, (distilled water, partially ionized and molecularly ordered by the use of ceramic magnets), is taken from a main tank (01) and reaches the electrolyzer (02 and 03)

Once the electrical supply of the electrolyzer (02,03) is connected, it is left to work for 25 sec. until it reaches a pressure greater than 1,200 Kg/cm2 if it is for an aspirated motor or 2,300 in the case of injection motors. Once the equilibrium point for the work is reached, the gas is given way by opening the micrometric key that allows to visualize the gas flow and then passes through a bubbler that works in turn as a safety element before a return of flame due to failure. The gas circulates through the respective duct until it reaches the gas entry into the flow regulator, continuing through the duct to the injector.

During the gas operation, a change in its regularity, silent walking, could be observed in the engine, as well as greater acceleration and power.

I am able to estimate an energy production of 4 units using to refuel the system 1 unit leaving a free energy of 3 units or the equivalent of 75% of the product.

The invention claimed is:

1. A hydrogen-oxygen gaseous fuel generating equipment adapted to be connected to an internal combustion engine comprising:
    a hydrogen and oxygen gas ($H_2$—$O_2$) generation circuit including:
    a main water tank having at least one outlet duct and at least one inlet duct;
    a pump connected to each inlet duct of the main water tank, the pump supplies water to the main water tank;
    at least one carbon filter located between the pump and each inlet duct of the main water tank;
    an electrolyzer having electrolyzing plates, each one of the electrolyzing plates is connected to a corresponding outlet duct, the electrolyzing plates are powered by an electrical energy source having an electric accumulator, wherein the electrolyzing plates generate the oxygen hydrogen gas;
    a decanter tank connected to the electrolyzing plates, the oxygen hydrogen gas is transferred from the electrolyzing plates to the decanter tank;
    a mix feeder device connected to the decanter, the mix feeder device mixes the oxygen hydrogen gas from the decanter tank with water steam, and then feeds the mixture into the internal combustion engine.

2. The generating equipment according to claim 1, wherein the electrolyzing plates are made of stainless steel and are equipped inside with a core containing a set of positively charged electrodes and a set of negatively charged electrodes, wherein the electrolyzing plates work at a direct current of 24 volt and 80 to 150 A of intensity.

3. The generating equipment, according to claim 1, wherein the electrolyzing plates are arranged symmetrically, at a distance between 1.7 cm and 3.2 cm.

* * * * *